Feb. 4, 1930.  P. DE MATTIA  1,746,107
VULCANIZING MOLD
Filed May 21, 1926
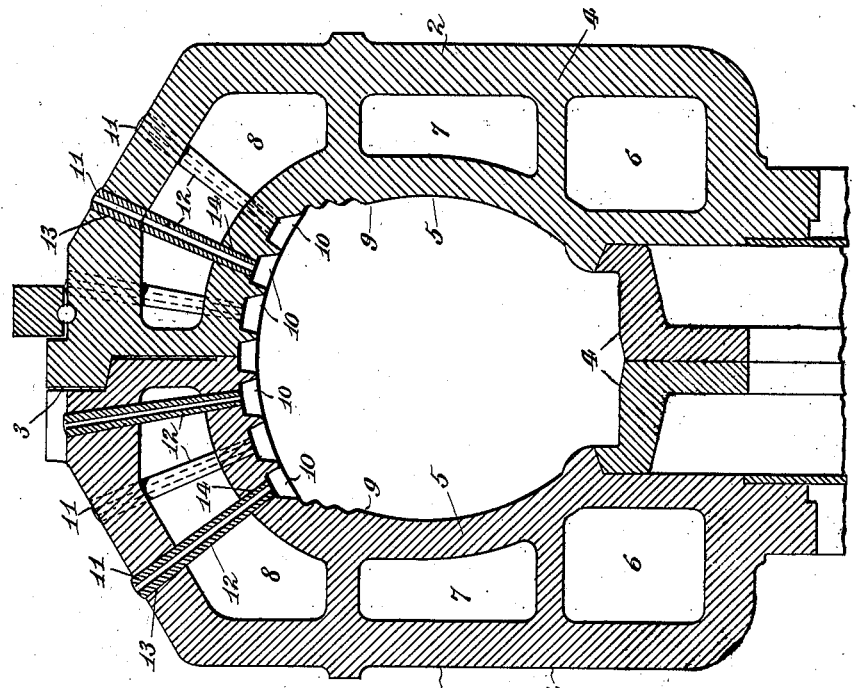
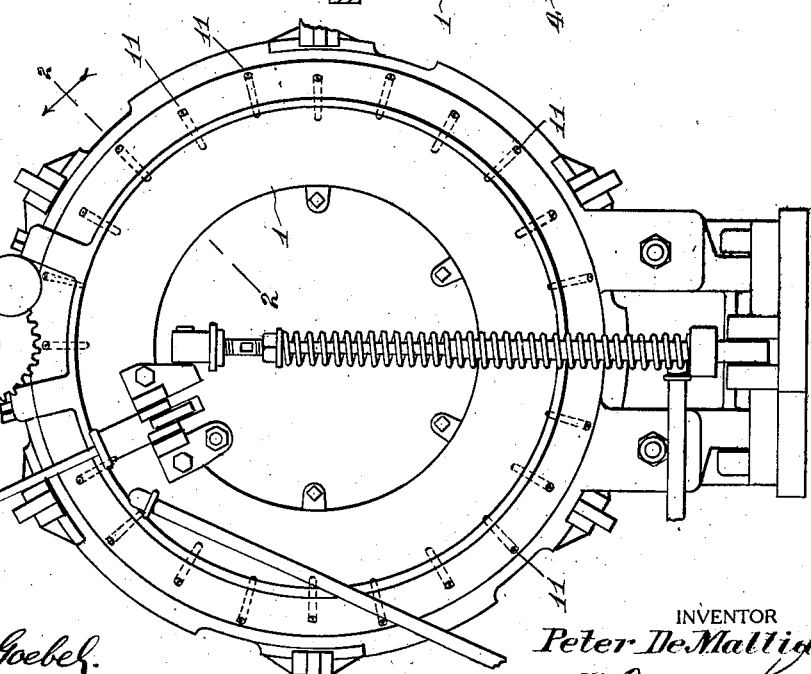
INVENTOR
Peter DeMattia Patented Feb. 4, 1930

1,746,107

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MOLD

Application filed May 21, 1926. Serial No. 110,735.

The present invention relates to vulcanizing molds, and more particularly to molds for vulcanizing rubber pneumatic tires.

In the manufacture of rubber articles, particularly those provided with projections or protuberances on the surface thereof, the vulcanizing mold in which the rubber article is cured is provided upon its molding surface with pockets or cells into which the uncured or green rubber is forced by pressure preliminary to the application of heat thereto to vulcanize it and during the vulcanizing process the pressure is maintained so that the exposed surface of the article will be provided with the desired projections or protuberances; for instance in the formation of so-called "non-skid" tread surfaces on rubber pneumatic tires.

As the green rubber is forced against the shaping face of the mold and into the recesses or pockets which form the projections, the air in the pockets escapes from the pockets through vents, thus permitting the rubber to freely enter and fill the pockets.

An object of the present invention is to provide means for the escape of air from the shaping face of the mold in those molds in which steam chambers are provided, in such a manner as not to permit the leakage of steam therefrom or otherwise interfere with its proper function.

The invention therefore consists of a vulcanizing mold provided between its inner and outer walls with a steam chamber and an air vent leading from the shaping surface to the outer surface and passing through the steam chamber so arranged as to prevent the leakage of steam from the steam chambers, and it further consists of the devices and combinations of devices which will be hereinafter described and claimed.

The invention is shown in the accompanying drawing as applied to a vulcanizing mold for the manufacture of shoes or casings for pneumatic tires in which Fig. 1 shows a front elevation of a vulcanizing mold embodying the invention.

Fig. 2 shows a sectional view taken on the line 2—2 in Fig. 1 very much enlarged as compared to Fig. 1.

Similar reference characters will be employed to designate corresponding parts.

The mold comprises two members, 1 and 2, substantially circular in form and provided with a complementary mating joint 3 adjacent the outer peripheries, and receiving bead supporting rings 4 adjacent the inner peripheries, or if desired the bead supporting rings 4 may be omitted and a suitable complementary mating joint may be provided adjacent the inner peripheries as well as at the outer peripheries.

As shown in Fig. 2 each of the mold members is an integral casting provided with an outer wall 4 and an inner wall 5 between which are steam chambers 6, 7 and 8, or instead of a plurality of steam chambers as indicated there may be only two steam chambers 6 and 8, or a single steam chamber of the required size to extend along all portions of the tire requiring the application of heat.

The inner opposed faces of the mold members 1 and 2 are provided with the shaping or molding surfaces 9, against which the rubber to be shaped and vulcanized is pressed and held during the vulcanizing process. In the form of the invention shown in the drawing the shaping faces 9 are intended to impart to the tread surfaces of the tire a studded construction, and for this purpose that portion of the shaping face corresponding to the tread portion of the tire to be formed, is provided with cells or pockets 10, preferably arranged in staggered relation to each other, into which the green rubber is forced preliminary to vulcanizing it, thus producing on the tread surface of the finished vulcanized tire a band of staggered studs or projections.

In order to permit the escape of air as the rubber is forced against the shaping surfaces of the mold tubular air vents 11, leading from the inner to the outer surface of the mold, are provided. These air vents 11 as shown are formed of steel tubes 12 externally tapered which are driven into tapering bores 13 and 14 formed in the outer wall 4 and the inner wall 5 and passing through the steam chambers 8. The openings 13 and 14 are formed by drilling through the cast iron of which these molds are generally made and they are thereafter reamed so as to produce the desired and necessary outwardly flaring taper corresponding to the external taper of the steel tubes 12. By thus forming the tubes and the openings in which they are fitted the tubes may be tightly driven into place forming a tight fit, effectually preventing the escape of steam from the steam chambers, as it is obvious that the tapered tubes may be driven in until a steam tight joint is effected in both the inner and outer walls and the tubes firmly secured in position. After they are driven in the inner and outer ends will be dressed off as required.

In the drawings I have shown certain instrumentalities for supporting and operating the mold members, but as such instrumentalities form no part of the present invention I have deemed it unnecessary to describe the same.

Having described my invention, I claim:

A jacketed vulcanizing mold having inner and outer walls provided with registering tapered openings, and a tapered tube fitted into said registering openings, said tube being driven into said openings to thereby provide a steam-tight joint between the tube and the walls of the mold and confined therein solely by the wedge contact between the tapered surface of the tube and the tapered surfaces of the openings.

PETER DE MATTIA.